(12) United States Patent
Buck

(10) Patent No.: US 11,462,204 B2
(45) Date of Patent: Oct. 4, 2022

(54) WIND TURBINE AND METHOD FOR NOISE REDUCTION FOR A WIND TURBINE

(71) Applicant: Siemens Gamesa Renewable Energy A/S, Brande (DK)

(72) Inventor: Steven Buck, Boulder, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 22 days.

(21) Appl. No.: 17/014,727

(22) Filed: Sep. 8, 2020

(65) Prior Publication Data

US 2022/0076655 A1 Mar. 10, 2022

(51) Int. Cl.
*G10K 11/178* (2006.01)
*F03D 80/00* (2016.01)
(Continued)

(52) U.S. Cl.
CPC ...... *G10K 11/17854* (2018.01); *F03D 1/0633* (2013.01); *F03D 7/0296* (2013.01);
(Continued)

(58) Field of Classification Search
CPC ...... F03D 80/00; F03D 1/0633; F03D 7/0296; G10K 2210/3027; G10K 11/17853;
(Continued)

(56) References Cited

U.S. PATENT DOCUMENTS 5,689,572 A * 11/1997 Ohki ............... G10K 11/17825
381/71.3
5,852,667 A * 12/1998 Pan ................. G10K 11/17881
381/71.1
(Continued)

FOREIGN PATENT DOCUMENTS

DE 102018127415 A1 * 5/2020 ........... F03D 7/0296
EP 2599996 A1 * 6/2013 ............. F03D 7/048
(Continued)

OTHER PUBLICATIONS

Translation of DE 10 2018 127 415 A1; Vera-Tudela et al. (Year: 2018).*
(Continued)

*Primary Examiner* — Courtney D Heinle
*Assistant Examiner* — Ryan C Clark
(74) *Attorney, Agent, or Firm* — Schmeiser, Olsen & Watts LLP

(57) ABSTRACT

Wind turbine comprising a tower (2) bearing a nacelle (5) and a rotor (3) with a plurality of rotor blades (4) and an active noise reduction device (7), wherein the active noise reduction device (7) comprises at least one actuator (8), at least one unsteady pressure sensor (9) adapted to produce an output signal corresponding to a turbulent flow condition during operation of the rotor blade (4), at least one noise sensor (10) adapted to produce an output signal corresponding to a noise generated by the rotor blade (4) at the location of the noise sensor (10), and a control unit (11), wherein the unsteady pressure sensor (9) and the actuator (8) are arranged on at least one of the rotor blades (4) and the noise sensor (10) is arranged at the nacelle (5) and/or at the tower (2), wherein the control unit (11) is adapted to control the actuator (8) in dependence of the output signals of the unsteady pressure sensor (9) and the noise sensor (10) to emit an anti-noise signal at least partly reducing the noise generated by the rotor blade (4).

17 Claims, 3 Drawing Sheets

Figure 1:
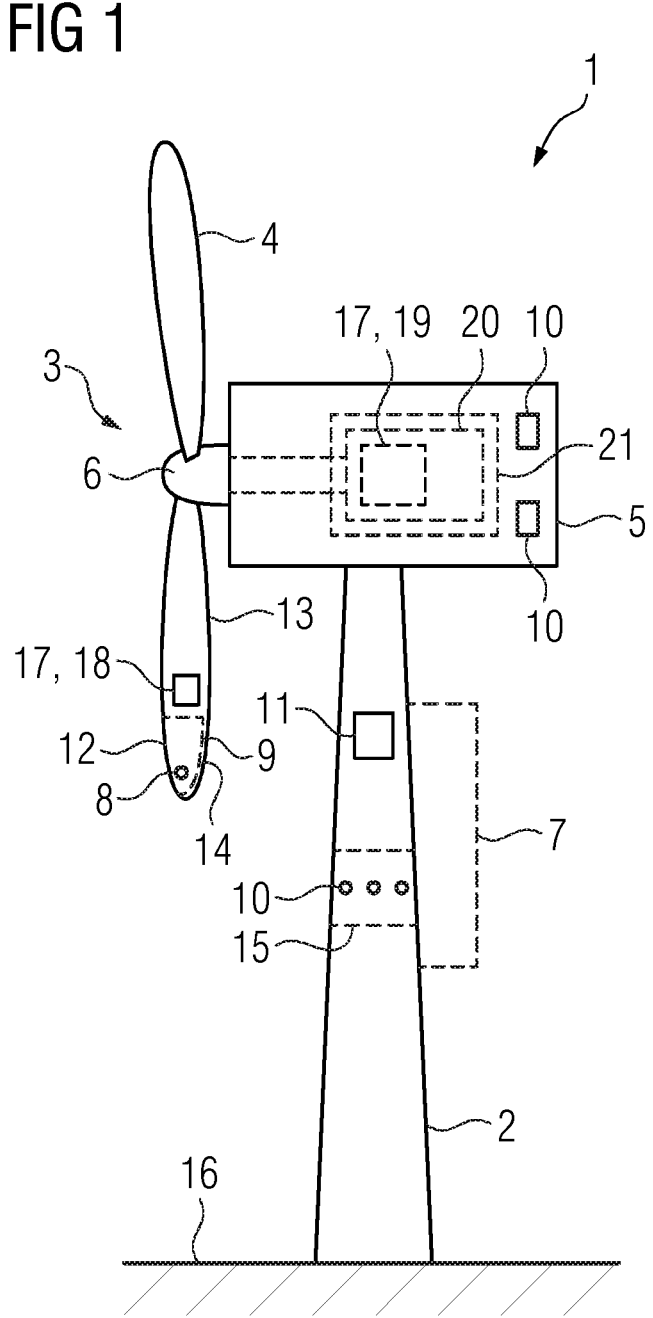

(51) Int. Cl.
*F03D 1/06* (2006.01)
*F03D 7/02* (2006.01)
(52) U.S. Cl.
CPC ............ *F03D 80/00* (2016.05); *F03D 1/0675* (2013.01); *F05B 2260/962* (2013.01); *F05B 2270/333* (2013.01); *F05B 2270/404* (2013.01); *F05B 2270/80* (2013.01); *G10K 2210/3027* (2013.01)
(58) Field of Classification Search
CPC ............ F05B 2260/962; F05B 2270/33; F05B 2270/404; F05B 2270/80
See application file for complete search history.

(56) References Cited

U.S. PATENT DOCUMENTS

| | | | |
|---|---|---|---|
| 9,435,320 B2* | 9/2016 | Duncan | F03D 7/024 |
| 2012/0025530 A1* | 2/2012 | Kinzie | F03D 7/048 |
| | | | 290/44 |
| 2012/0027591 A1* | 2/2012 | Kinzie | F03D 7/0296 |
| | | | 416/1 |
| 2012/0139254 A1* | 6/2012 | Attia | F03D 13/20 |
| | | | 290/55 |
| 2014/0241878 A1* | 8/2014 | Herrig | F03D 17/00 |
| | | | 416/1 |
| 2014/0334928 A1* | 11/2014 | Baek | F03D 7/045 |
| | | | 416/1 |
| 2015/0195646 A1* | 7/2015 | Kumar | G10K 11/17821 |
| | | | 381/71.8 |
| 2016/0312763 A1* | 10/2016 | Arce | F03D 1/0633 |
| 2017/0150246 A1* | 5/2017 | Rule | G10K 11/17854 |
| 2017/0175714 A1* | 6/2017 | Asheim | F03D 7/00 |
| 2017/0193975 A1* | 7/2017 | Butts | G10K 11/17837 |
| 2017/0278504 A1* | 9/2017 | Ross | G10K 11/17854 |

FOREIGN PATENT DOCUMENTS

| | | |
|---|---|---|
| EP | 3249216 | 11/2017 |
| ES | 2327696 | 11/2009 |
| WO | 2008043874 | 4/2008 |
| WO | WO-2020098892 A1 * | 5/2020 ............ F03D 7/0296 |

OTHER PUBLICATIONS

Roy Soumya et al: "Simulation Study of Active Noise Control in Wind Turbines Using FxLMS Adaptation Algorithm"; 14th International Heat Pipe Conference (14th IHPC); vol. 05; No. 08; Jan. 1, 2017; pp. 72-83; XP055863910; ISSN: 2327-588X; DOI: 10.4236/jpee.2017.58006 Retrieved from the Internet: URL:https ://pdfs.semanticscholar.org/ 8ba5/8bb41 bf9991 f43f2f2534f22e44df716c292.pdf.
International Search Report dated Dec. 2, 2021 in related PCT Patent Application No. PCT/EP2021/073141, 13 pgs.

* cited by examiner

WIND TURBINE AND METHOD FOR NOISE REDUCTION FOR A WIND TURBINE

FIELD OF TECHNOLOGY

The invention relates to a wind turbine comprising a tower bearing a nacelle and a rotor with a plurality of rotor blades and an active noise reduction device, wherein the active noise reduction device comprises at least one actuator and at least one unsteady pressure sensor adapted to produce an output signal corresponding to a turbulent flow condition during operation of the rotor blade. Furthermore, the invention relates to a method for noise reduction for a wind turbine.

BACKGROUND

Trailing edge noise emitted from a rotor blade during operation of a wind turbine is the dominant noise generation mechanism for modern industrial scale wind turbines. The noise generated from a wind turbine during its operation determines the region where the wind turbine may be erected, or correspondingly the manner in which the wind turbine may be operated in order to comply with noise limitations in the surroundings of the wind turbine.

The emittance of excessive noise during operation of the wind turbine may cause a necessity to operate the wind turbine in a curtailed operation mode, wherein power generation is sacrificed in order to limit the noise emission. Thus, the noise emission of wind turbine may directly affect its economic viability. Therefore, there is a demand for noise reduction technologies, in particular for onshore wind turbines, in order to limit the noise emitted by a wind turbine during operation.

A method for limiting the noise emitted by a wind turbine is the usage of serrations at the trailing edge of the rotor blades to passively reduce the noise emitted at the trailing edge of the rotor blades. However, the maximal noise reduction obtainable by the usage of passive noise reduction devices appears to be limited, so that additionally or alternatively active noise cancellation systems may be used to actively reduce the noise emitted from the rotor blades during operation. An active noise cancellation system uses generally sensors to measure surface pressure fluctuations on the surface of the rotor blades to feed an anti-noise controller that generates an inverted acoustic signal, negating the trailing edge noise in the far field, or in the surroundings of the wind turbine, respectively.

In EP 3 249 216 A1, a rotor blade with noise reduction means is described. The rotor blade comprises at least one sensor for detecting flow characteristics of a fluid flowing substantially from the leading edge to the trailing edge of the rotor blade. The rotor blade further comprises at least one actuator for producing an anti-noise signal for at least partly cancelling out the flow-induced edge noise of the rotor blade.

SUMMARY

It is an objective of the invention to provide an improved wind turbine and an improved method for a wind turbine which in particular allow for an improved noise reduction during operation of the wind turbine.

According to the invention, this objective is solved by a wind turbine as initially described, wherein the active noise reduction device further comprises at least one noise sensor adapted to produce an output signal corresponding to a noise generated by the rotor blade at the location of the noise sensor, and a control unit, wherein the unsteady pressure sensor and the actuator are arranged on at least one of the rotor blades and the noise sensor is arranged at the nacelle and/or at the tower, wherein the control unit is adapted to control the actuator in dependence of the output signals of the unsteady pressure sensor and the noise sensor to emit an anti-noise signal at least partly reducing the noise generated by the rotor blade.

The tower supports a nacelle to which the rotor is mounted and may comprise one or more tower segments arranged between the ground and the nacelle. The rotor comprises a plurality of rotor blades, for instance three rotor blades, wherein to at least one of the rotor blades the at least one actuator and the at least one unsteady pressure sensor of the active noise reduction device are mounted. In particular, the active noise reduction device may comprise a plurality of actuators and a plurality of unsteady pressure sensors, which are in particular arranged on and/or affixed to all of the rotor blades of the wind turbine to allow for a noise reduction of the trailing edge noise of all rotor blades of the wind turbine.

The at least one unsteady pressure sensor may be mounted in particular close to a trailing edge of the rotor blade, since the majority of the noise emitted by a rotor blade is created at the trailing edge of the rotor blade. By the at least one unsteady pressure sensor, a pressure fluctuation at the rotor blade, in particular at the trailing edge of the rotor blade, is detected, so that the unsteady pressure sensor may produce an output signal corresponding to a turbulent flow condition during operation of the rotor blade. This unsteady pressure situation measured by the unsteady pressure sensor corresponds to a near-field pressure fluctuation situation at the trailing edge and in particular close to the surface of the rotor blade. This near-field pressure fluctuation situation is related to the far-field acoustic noise generation of the rotor blade.

Based on the output signals of the unsteady pressure sensors, the control unit may determine an anti-noise signal corresponding to the turbulent flow condition and hence to the noise generation at the rotor blade. The determined anti-noise signal may be emitted from the at least one actuator of the active noise reduction device in order to reduce the noise in a far-field, hence in the vicinity of the wind turbine, or in the surroundings of the wind turbine, respectively.

In order to improve the noise reduction in the far-field of the wind turbine, the active noise reduction device further comprises at least one noise sensor, which is adapted to produce an output signal corresponding to a noise generated by the rotor blade at the location of the noise sensor. Unlike the unsteady pressure sensor and the actuator, which are arranged at the at least one rotor blade of the wind turbine, the noise sensor of the active noise reduction device is arranged for example at the tower, hence in a distance to the rotor blades or the further components of the active noise reduction device, respectively. This allows for measuring a noise signal using the at least one noise sensor which corresponds to a noise generated by two rotor blades that can be measured at the tower of the wind turbine and hence, also in the far-field of the rotor blade. The knowledge about the noise that can be detected at the position of the tower of the wind turbine helps for creating an anti-noise signal which also reduces the noise in a far-field further away from the wind turbine, for instance in a housing area in the neighbourhood of the wind turbine or the like.

The noise sensor may be arranged at the nacelle, in particular at a backside of the nacelle and/or at a tower of the wind turbine. The arrangement of the noise sensor, or at least a part of the noise sensors, respectively, at the tower has the advantage that a blade-to-blade noise isolation is improved, since the measured noise at the location of the noise sensor may be correlated with the noise generation of the rotor blade closest to the tower. Furthermore, a determination of a spanwise source of the noise generation may be located at the tower without the usage of complex microphone array techniques.

The noise sensor allows for correction of an emitted anti-noise signal, for instance if the noise measured by the at least one noise sensor is still above a predetermined threshold. The usage of the at least one noise sensor has the advantage that a control and/or a correction of the noise reducing function of the anti-noise reduction device may be adjusted during operation of the wind turbine. Effects like sensor degradation of the at least one unsteady pressure sensor and/or a changing trailing edge geometry over time, which may be originated in damage or wear of the trailing edge, may be considered and compensated. Also varying flow conditions of the fluid, in particular air or wind, respectively, causing the turbulent flow at the rotor blade may be taken into account by the generation of the anti-noise signal using the at least one noise sensor at the tower of the wind turbine. By the usage of the at least one noise sensor, the robustness of the active noise reduction device and its noise reducing capabilities are improved. Therefore, the reliability of the active noise reduction device and the amount of noise, which can be reduced using the active noise reduction device, are increased advantageously.

In a preferred embodiment of the invention, the unsteady pressure sensor and the actuator are arranged in at least one arrangement portion of a shell of the rotor blade, wherein the noise sensor is arranged on the outside of the nacelle and/or an outside of the tower in an opposing portion that opposes the arrangement portion of the rotor blade at least partly when the rotor blade is aligned in a downward direction parallel to the tower. When the rotor of the wind turbine is rotating, the rotor blades of the rotor are aligned parallel to the tower at a certain point of time, in particular when the rotor blade is pointing vertically downwards from a hub of the rotor.

In a position, in which the rotor blade is parallel to the tower, an opposing portion on the nacelle and/or the tower exists, which opposes the arrangement portion of the shell of the rotor blade, wherein in this opposing portion the at least one noise sensor of the active noise reduction device is arranged. In other words, the at least one noise sensor of the active noise reduction device is arranged in an opposing portion at the nacelle and/or at the tower, wherein the opposing portion and the arrangement portion on the shell of the rotor blade have the same distance to a ground on which the wind turbine stands.

The arrangement of the at least one noise sensor in the opposing portion has the advantage that a spatial distance between the at least one noise sensor and in particular the at least one unsteady pressure sensor of the wind turbine and/or the at least one actuator is comparatively small, in particular around these points in time, in which the rotor blade is aligned parallel or essentially parallel to the tower.

Preferably, the active noise reduction device comprises a plurality of noise sensors, wherein the noise sensors are arranged annularly around an outer circumference of the tower. The tower may comprise for instance a plurality of tower segments which support the rotor and/or the nacelle located at the top of the tower. These tower segments may exhibit for instance a cylindrical shape so that the anti-noise sensors may be arranged annularly around the outer circumference of the tower or one of the tower segments, respectively.

Preferably, the unsteady pressure sensor and/or the actuator are arranged in the tip region of the rotor blade and/or the unsteady pressure sensor is arranged on a trailing edge of the rotor blade. The noise generation during operation of the wind turbine is largest in the tip region of the wind turbine blade so that in particular a positioning of the unsteady pressure sensor and the actuator in the tip region of the rotor blade is advantageous. The tip region of the rotor blade may be in particular the outermost 10% to 30%, in particular the outermost 20% of the rotor blade length. Since the main source for noise generation is the trailing edge of the rotor blade, the unsteady pressure sensor may be arranged in particular on a trailing edge of the rotor blade.

In a preferred embodiment of the invention, the actuator comprises a loudspeaker and/or the unsteady pressure sensor comprises a pressure transducer, in particular a surface pressure transducer and/or a microphone, and/or the noise sensor comprises a pressure transducer, in particular a microphone. The actuator may be in particular an active loudspeaker comprising an amplifier so that an anti-noise signal generated by the control unit may be amplified by the actuator prior to an emittance of the anti-noise signal.

Preferably, the control unit is adapted to use at least one actuator transfer function describing a relation between the input signal to the at least one actuator and the far-field noise for determination of the anti-noise signal.

The at least one actuator transfer function between the at least one actuator and the at least one far-field noise sensors may be measured directly by for example generation of a signal through the at least one actuator comprising for instance a loudspeaker and the simultaneous measurement of the received signal at the at least one far-field noise sensor. The actuator transfer function may be expressed in the discrete time domain as an impulse response function.

The actuator transfer function may describe the relation between the input signal of the at least one actuator and a far-field noise generated in a region of interest in the vicinity of the wind turbine, in which a noise emitted by the wind turbine shall be reduced. The actuator transfer function may be stored for example in the control unit of the active noise reduction device. The actuator transfer function allows for determining a noise generated by the actuator depending on the input signal that is sent to the actuator, for example an electrical signal.

Preferably, the control unit is adapted to apply at least one filter function to the output signal of the unsteady pressure sensor for determining an input signal for the actuator to emit the anti-noise signal, wherein the control unit is adapted to adjust the filter function in dependence of the output signal of the noise sensor, in particular in an adaptive feedforward control.

In particular, the control unit is implemented to apply a filter to the unsteady pressure signals to determine an input signal of the actuator, so that the actuator emits an anti-noise signal, in particular from the at least one loudspeaker of the actuator. The control unit is further implemented to adapt the filter based on the signal from the at least one far-field noise sensor, in particular in an adaptive feed-forward controller. The filter function applied to the output signal from the at least one unsteady surface pressure sensor is in particular related to a transfer function between the unsteady surface pressure and the far-field noise, though the transfer function between the unsteady surface pressure and the far-field noise does not need to be directly known in for example an adaptive feedforward controller.

The filter function relates the output signals from the at least one unsteady pressure sensor to the signals sent to the at least one actuator. The filter function may be implemented for example as a weighted linear combination of stored signal samples from the at least one unsteady pressure sensors. This may be expressed mathematically as follows:

$$y_m(n) = x(n) w_m(n)$$

Here, y(n) is a signal sent to a loudspeaker expressed in discrete time n, m is an index between 1 and M, where M is the number of loudspeakers, x is a horizontal vector containing previously recorded samples of the signals from the at least one unsteady pressure sensors, and w is the filter function expressed as a vertical vector of equal length to x containing weighting scalars.

The filter function w may be calculated for example by using the measured relationship between the unsteady pressure described by the output signals of the at least one unsteady pressure sensor and the far-field noise at the one or more far-filed noise sensors. The filter function is in particular dependent on the relationship between the unsteady pressure signals and the far-field sound, though it is not necessary to calculate this relationship in the form of a transfer function at any point due to the usage of the adaptive filter function.

The output signal of the noise sensor may be used to adapt the filter function w, hence to allow for a correction of the filter function based on a noise measured at a location of the noise sensor. This adaptation of the filter function is referred to as an adaptive feed-forward control, and may be used in particular when aiming at a noise reduction in a location further away from the wind turbine. The application of a filter function of the form described above is suited for control of a linear system. The control system can be augmented or modified to control non-linear relationships between surface pressures and far field noise such as frequency shifting or harmonic generation by the use of for example neural networks or other machine learning algorithms.

Preferably, the control unit comprises or is connected to a rotor orientation sensor, in particular a gravity sensor arranged on the at least one rotor blade and/or a rotary encoder coupled to the rotor, determining the relative position between the rotor blades and the tower during an operation of the wind turbine, wherein the control unit is adapted to adjust a filter function in a period of time in which the at least one rotor blade is at least temporarily in a downward direction or a nearly downward direction parallel to the tower. This allows for taking into account the rotating movement of the rotor blade relative to the stationary noise sensor, or the rotating movement of the unsteady pressure sensor and the actuator, respectively, for the adaption of the active noise reduction device.

In order to reduce the influence of the rotating movement of the rotor blade, an adaption of the filter function in a period of time in which the at least one rotor blade is at least temporarily in the nearly downward direction parallel to the tower, or a downward direction parallel to the tower, respectively, allows for the usage of a mainly stationary and/or reproducible situation, in which a distance between the at least one unsteady pressure sensor and the at least one actuator at the rotor blade and a noise sensor at the tower is minimized and/or approximately constant for each adjustment of the transfer function.

The adjustment of the unsteady pressure filter function occurs in particular during a period of time, in which the at least one rotor blade is at least temporarily arranged in a nearly downward direction parallel to the tower. Hence, the transfer function is adapted in a period of time which comprises a point in time at which the rotor blade is arranged parallel to the tower, or in which the rotor blade moves through the parallel positioning towards the tower, respectively. The position of the rotor, and in particular of each of its rotor blades, may be determined by the rotor orientation sensor of the control unit or a rotor orientation sensor connected to the control unit, respectively.

The rotor orientation sensor may be a gravity sensor arranged on the at least one rotor blade and/or a rotary encoder coupled to the rotor. A gravity sensor arranged on the at least one rotor blade may determine the position of the rotor blade in relation to a direction of gravity and hence the point in time when the at least one rotor blade is in a downward direction or a nearly downward direction parallel to the tower. The rotor orientation may also be determined using a rotary encoder coupled to the rotor. Such a rotary encoder may be for instance a part of an electric machine used as generator and/or of a drive train of the wind turbine, wherein the rotary encoder determines the position of a shaft of the drive train and/or of a rotor of the electric machine and hence also the positioning of the rotor of the wind turbine, which is coupled to the drive train and the generator.

Preferably, on each of a plurality of rotor blades at least one actuator and at least one unsteady pressure sensor are arranged, wherein the control unit is adapted to use a separate filter function for each of the rotor blades and to adjust the separate filter functions each in a period of time in which the corresponding rotor blade is at least temporarily in a downward direction or a nearly downward direction parallel to the tower. This allows for adapting the emittance of the anti-noise signal individually for each of the rotor blades so that effects that may occur only on a single blade, for instance a damaged trailing edge or the like, may be compensated effectively.

In a preferred embodiment of the invention, the control unit is adapted to use an adaptive filter of a filtered-x least mean squares (FxLMS) algorithm as the filter function. The filtered-x LMS algorithm is an adaptive feed-forward control comprising an adaptive filter. This adaptive filter may be provided as the filter function describing the dependency between the output signal of the unsteady pressure sensors and the anti-noise signal to be sent to the actuators, respectively.

The adaptive filter may be adapted in dependence of an output signal from the noise sensor. The output signal of the noise sensor may in particular be compared to an expected noise level at the position of the noise sensor, wherein the expected noise level is determined using a model of the wind turbine, in particular of the rotor blade and the active noise system. From the model, an expected noise level at the current operational state of the wind turbine, or the rotor blade, respectively, may be obtained. The adaption of the filter may occur for instance based on a difference between the expected noise level and the measured noise level described by the output signal of the noise sensor. The adaptive filter may alternatively be adapted in order to minimize the noise at the location of at least one far-field noise sensor, for example in a mean squared pressure sense.

In either case, the control unit may comprise a control algorithm that aims to minimize a prescribed cost function, where the cost function may be the difference at the far-field noise sensor between a desired noise level and the measured noise level, or the cost function may be the noise level at the far-field sensor. The former embodiment would require the relationship between the near field unsteady pressure and the far field noise be modelled in order to generate an expected, desired noise level based on unsteady surface pressures. Minimizing the noise level itself can be accomplished by for example a gradient-based minimization algorithm to adapt the filter function with no need for a model of the expected noise level.

Preferably, the at least one rotor blade comprises a trailing edge with a passive noise reduction device, in particular a serrated trailing edge profile. By adding a passive noise reduction device like a serrated trailing edge profile, the noise emitted by the wind turbine may be further reduced. The passive noise reduction device, in particular the serrated trailing edge profile, may be arranged on the entire trailing edge of the rotor blade and not only in the vicinity to the components of the active noise reduction device mounted on the rotor blade.

A method for noise reduction for a wind turbine according to the invention uses a wind turbine comprising a tower bearing a nacelle and a rotor with a plurality of rotor blades and an active noise reduction device, wherein the active noise reduction device comprises at least one actuator, at least one unsteady pressure sensor adapted to produce an output signal corresponding to a turbulent flow condition during operation of the wind turbine blade, at least one noise sensor adapted to produce an output signal corresponding to a noise generated by the rotor blade at the location of the noise sensor, and a control unit, wherein the unsteady pressure sensor and the actuator are arranged on at least one of the rotor blades and the noise sensor is arranged at the nacelle and/or at the tower, wherein the control unit controls the actuator in dependence of the output signals of the unsteady pressure sensor and the noise sensor to emit an anti-noise signal at least partly reducing the noise generated by the rotor blades.

Preferably, the control unit applies at least one filter function to the output signal of the at least one unsteady pressure sensor for determining an input signal for the actuator to emit the anti-noise signal, wherein the control unit adjusts the filter function in dependence of the output signal of the noise sensor, in particular in an adaptive feedforward control.

In a preferred embodiment of the invention, the control unit comprises or is connected to a rotor orientation sensor, in particular a gravity sensor arranged on the at least one rotor blade and/or a rotary encoder coupled to the rotor, determining the relative position between the rotor blades and the tower during an operation of the wind turbine, wherein the control unit adjusts the filter function in a period of time in which the at least one rotor blade is at least temporarily in a downward direction or a nearly downward direction parallel to the tower.

Preferably, on each of a plurality of rotor blades at least one actuator and at least one unsteady pressure sensor are arranged, wherein the control unit uses a separate filter function for each of the blades and adjusts the separate filter functions each in a period of time in which the corresponding rotor blade is at least temporarily in a downward direction or a nearly downward direction parallel to the tower.

Preferably, the control unit uses an adaptive filter of a filtered-x least mean squares (FxLMS) algorithm as the filter function.

All details and advantages described previously with regard to the wind turbine according to the invention apply correspondingly to the method for noise reduction for a wind turbine according to the invention.

BRIEF DESCRIPTION

Figure 2:
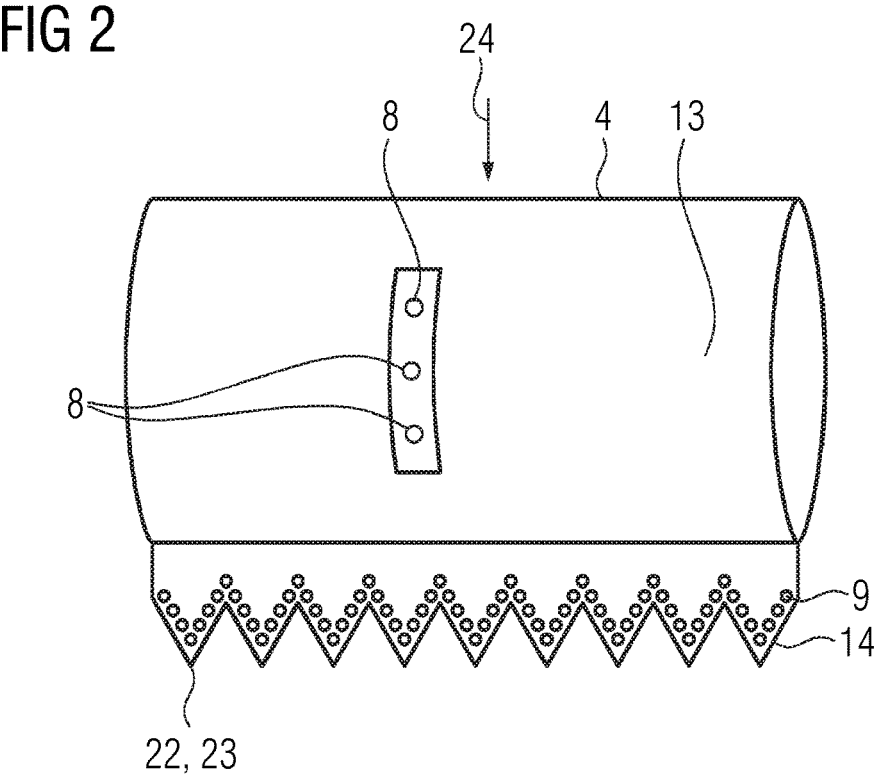
Figure 3:
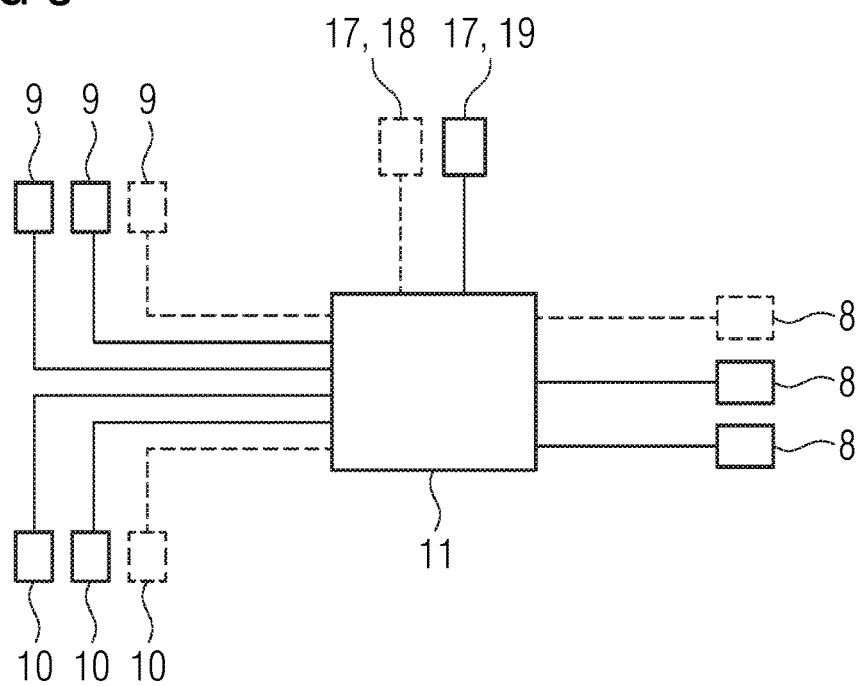
Figure 4:
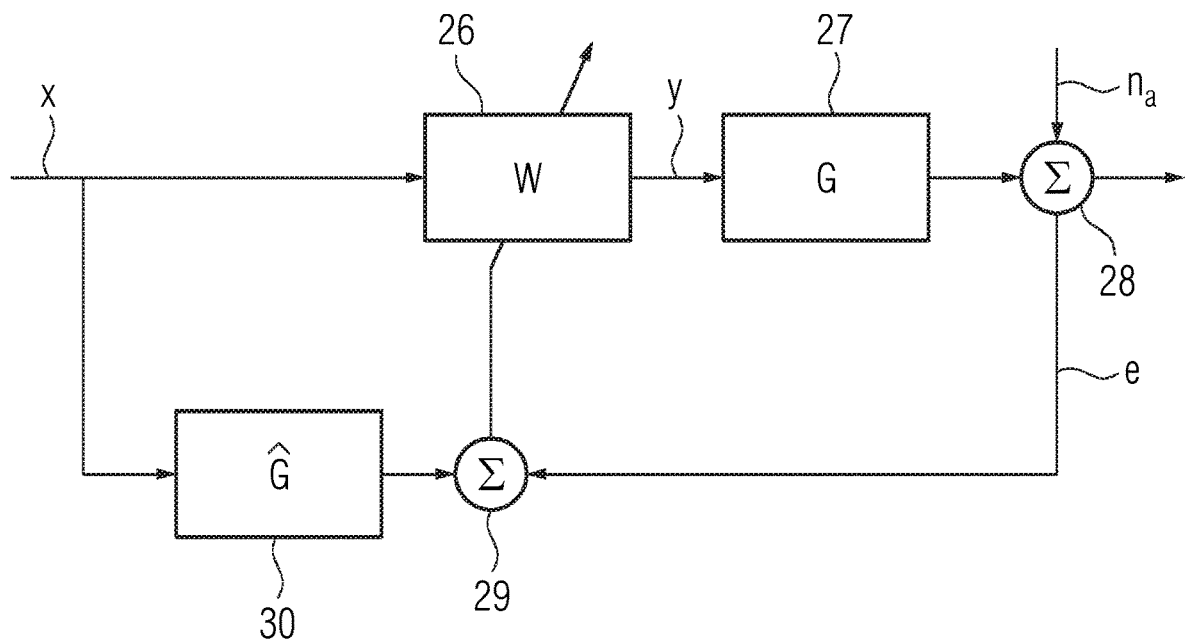

Other objects and features of the present invention will become apparent from the following detailed description considered in conjunction with the accompanying drawings. The drawings, however, are only principle sketches designed solely for the purpose of illustration and do not limit the invention. The drawings show:

FIG. 1 an embodiment of a wind turbine according to the invention,

FIG. 2 a detail of a rotor blade of a wind turbine according to the invention,

FIG. 3 a control unit of a wind turbine according to the invention adapted to be used in an embodiment of a method according to the invention, and FIG. 4 a block diagram of a control system used in a wind turbine according to the invention and in an embodiment of a method for noise reduction of a wind turbine according to the invention.

DETAILED DESCRIPTION

In FIG. 1, a wind turbine 1 is shown. The wind turbine 1 comprises a tower 2, which bears a rotor 3 with a plurality of rotor blades 4. The rotor 3 is mounted to a nacelle 5 of the tower 2. The rotor blades 4 of the rotor 3 are connected to a hub 6 of the rotor 3, wherein the rotor 3 and hence the rotor blades 4 rotate during operation of the wind turbine 1.

The wind turbine 1 comprises an active noise reduction device 7, wherein the active noise reduction device 7 comprises at least one actuator 8, a plurality of unsteady pressure sensors 9, a plurality of noise sensors 10, and a control unit 11. The actuator 8 as well as the unsteady pressure sensors 9 are arranged on and/or affixed to at least one of the rotor blades 4 of the wind turbine 1. In particular, at least one actuator 8 and at least one unsteady pressure sensor 9 are arranged on each of the rotor blades 4.

The noise sensors 10 are arranged at the tower 2, in particular at a tower segment of the tower 2 supporting the nacelle 5 of the tower 2. The noise sensors 10 are arranged annularly around the tower 2. Additionally or alternatively, the noise sensors 10, or some of the noise sensors 10, respectively, may be arranged at the nacelle 5, in particular at a backside of the nacelle 5. The control unit 11 is connected to the actuators 8, the unsteady pressure sensors 9, and to the noise sensors 10 via at least one wireless connection and/or via at least one cable connection (not shown).

The actuator 8 and the plurality of unsteady pressure sensors 9 are arranged in an arrangement portion 12 of a shell 13 of the rotor blade 4, wherein the unsteady pressure sensors 9 are arranged close to a trailing edge 14 of the rotor blade 4. The arrangement portion 12, in which the actuator 8 and the unsteady pressure sensors 9 are arranged, is located in the tip region of the rotor blade 4, wherein the tip region and hence the arrangement portion 12 covers in particular 10% to 30%, preferably 20%, of the length of the rotor blade 4 from the tip.

The noise sensors 10 at the tower 2 are arranged in an opposing portion 15, wherein the opposing portion 15 is located opposed to the arrangement portion 12 at the rotor blade 4 in a situation, in which the rotor blade 4 is arranged parallel to the tower 2 of the wind turbine 1 as depicted. In other words, both the arrangement portion 14 and the opposing portion 15 have the same distance to a ground 16, on which the wind turbine 1 is erected, when the rotor blade is aligned parallel to the tower 2 in a downward direction towards the ground 16.

The wind turbine 1 further comprises at least one orientation sensor 17 for determination of the relative position between the rotor blades 4 and the tower 2 during an operation of the wind turbine 1. The at least one orientation sensor 17 is connected to the control unit 11. In an alternative, also the control unit 11 may be arranged for instance in a rotor blade 4 of the wind turbine 1, wherein the control unit 11 may comprise a rotor orientation sensor 17. The rotor orientation sensor 17 arranged in the rotor blade 4 of the wind turbine 1 may be in particular a gravity sensor 18. In addition or as an alternative, a rotary encoder 19 provided as a part of a rotor 20 of a generator 21 of the wind turbine 1 arranged inside the nacelle 5 may be used as orientation sensor 17.

In FIG. 2, the arrangement of the unsteady pressure sensors 9 on the rotor blade 4 is shown in more detail depicting a segment of the rotor blade 4 within the tip region of the rotor blade 4, or the arrangement portion 12, respectively. The unsteady pressure sensors 9 are arranged close to the trailing edge 14 of the rotor blade 4. The trailing edge 14 comprises a passive noise reduction device 22, which is provided as a serrated trailing edge profile 23 comprising a plurality of teeth arranged along the trailing edge 14 of the rotor blade 4. Also the actuators 8 are arranged on the shell 13, wherein the actuators 8 are provided as loudspeakers for emittance of an acoustic anti-noise signal. Each of the actuators 8 may comprise an amplifier for amplifying an anti-noise signal generated by the control unit 11.

During operation of the wind turbine 1, noise is generated in particular at the trailing edge 14 of the rotor blades 4 by a turbulent flow condition caused by the air or the wind, respectively, streaming along the profile of the rotor blade 4 as indicated by the arrow 24. In order to reduce the noise emitted by the rotor blade 4 in a far-field or in a vicinity of the wind turbine 1, respectively, the actuators 8 are used to create an anti-noise signal at least partly reducing the noise created by the rotor blade 4 during operation of the wind turbine 1.

As it is depicted in FIG. 3, the control unit 11 receives the output signals of the unsteady pressure sensors 9 arranged at the rotor blade 4. In addition, the control unit 11 receives the output signals of the noise sensors 10 located at the tower 2 and/or at the nacelle 5 of the wind turbine 1. The control unit 11 is adapted to control the actuators 8 in dependence of the output signals of the unsteady pressure sensors 9 and the noise sensors 10 to emit an anti-noise signal at least partly reducing the noise generated by the rotor blade 4. Therefore, the control unit 11 is adapted to use at least one transfer function describing a relation between the output signal of the unsteady pressure sensors 9 and a far-field noise for determination of the anti-noise signal, which is emitted by the actuators 8. Furthermore, the control unit 11 is adapted to apply a filter function to the output signals of the unsteady pressure sensors 9 to obtain an input signal for the actuators 8. The actuators 8 emit the anti-noise signal based on the input signal from the control unit 11.

The control unit 11 is adapted to adjust the filter function in dependence of the output signals of the noise sensor 10 so that in particular a correction of the filter function may occur in case that the noise generated by the rotor 4 is measured at the locations of the noise sensors 10 at the tower 2 of the wind turbine 1.

In order to account for the rotating parts of the active noise reduction device 7, in particular the actuators 8 and the unsteady pressure sensors 9, the control unit 11 is adapted to adjust the filter function in a period of time in which the at least one rotor blade 4 is at least temporarily in a downward or nearly downward direction parallel to the tower 2. Therefore, the control unit 11 is connected to the orientation sensor 17. The control unit 11 may use the filter function in an adaptive feedforward control. The control unit 11 uses in particular a separate filter function for each of the rotor blades 4, so that the noise generated by each of the rotor blades 4 may be reduced individually. The control unit 11 adapts the filter function for each of the rotor blades 4 at or around the point in time, in which the corresponding rotor blade is aligned parallel to the tower 2.

In FIG. 4, a block diagram 25 of a feedforward control algorithm used in the control unit 11 is shown. In the block diagram 25, the vector x represents the surface pressures measured by the plurality of unsteady pressure sensors 9. Block 26 describes adaptive control filters as vector w used as a filter function in order to determine a vector of control signals y sent to the actuators 8.

Block 27 describes the physical relationship G between the actuators 8 and the noise sensors 10 located at the tower 2 of the wind turbine 1 in form of an actuator transfer function. The actuator transfer function describes for instance the relation between the input signal of the at least one actuator 8 and a far-field noise generated in a region of interest in the vicinity of the wind turbine 1, in which a noise emitted by the wind turbine shall be reduced.

The filter function relates the output signals x from the at least one unsteady pressure sensor to the signals sent to the at least one actuator. The filter function is implemented for example as a weighted linear combination of stored signal samples from the at least one unsteady pressure sensors. This is expressed mathematically as follows:

$$y_m(n) = x(n) w_m(n).$$

Here, $y_m(n)$ is a vector of signal sent to the actuators 8 expressed in discrete time n, m is an index between 1 and M, where M is the number of actuators 8, x is a horizontal vector containing previously recorded samples of the signals from the unsteady pressure sensors 9, and w is the filter function expressed as a vertical vector of equal length to x containing weighting scalars.

The filter function w of block 27 may be calculated by using the measured relationship between the unsteady pressure described by the output signals of the unsteady pressure sensors 9 and the far-field noise measured by the far-filed noise sensors 10. The filter function is dependent on the relationship between the unsteady pressure signals of the unsteady noise sensors 9 and the far-field sound, though it is not necessary to calculate this relationship in the form of a transfer function at any point due to the usage of the adaptive filter function.

In the summation node 28, the anti-noise signal generated by the actuators 8 merges with the noise $n_a$ generated at the rotor blade 4. The remaining error noise signal e measured at the noise sensors 10 is the output signal of the noise sensors 10 and describes the remaining noise generated from the rotor blade 4 and is fed into summation node 29. There, the error noise signal e is added to or subtracted from an expected noise level determined using a model of the noise system $\hat{G}$ in block 30 and the measured surface pressures x. The output of node 29 is used to adapt the adaptive filters W in block 26 in order to reduce the error noise signal e measured at the noise sensors 10.

The model of the system $\hat{G}$ in block 30 describes for instance propagation paths between the actuators 8 as secondary sources and the noise sensors 10. The adaption of the filter function or the adaptive filter w, respectively, occurs in dependence of an expected noise level at the position of the noise sensors 10 in the current state of operation and the actual error noise signal e measured at the position of the noise sensors 10. An adaption of the adaptive filters w in block 26 occurs in particular when the measured error noise signal e deviates from the expected noise level determined using the model $\hat{G}$ in block 30. The depicted block diagram 25 is an example of a filtered-x least mean squares (FxLMS) algorithm.

Both the unsteady pressure sensors 9 and the noise sensors 10 may be provided as unsteady pressure transducers, in particular as microphones. The adaption of the filters w in block 26 occurs, as previously described, in a period of time, in which a rotor blade 4 is arranged parallel to the tower 2 and hence in a situation in which the unsteady pressure sensors 9 are located close to the noise sensors 10. The adaption of the filters w in block 26 allows to take into account effects like the current flow condition of the fluid flowing along the rotor blade 4 as well as degradation effects occurring slowly during operation of the wind turbine 1, for instance degradation of the trailing edge 14 of the rotor blades 4 and/or degradation of the unsteady pressure sensors 9. The adaptive filter w in block 26 may alternatively be adapted in order to minimize the noise at the location of the noise sensors 10, for example in a mean squared pressure sense. Minimizing the noise level itself can be accomplished by for example a gradient-based minimization algorithm to adapt the filter function with no need for a model $\hat{G}$ of the expected noise level.

Although the present invention has been described in detail with reference to the preferred embodiment, the present invention is not limited by the disclosed examples from which the skilled person is able to derive other variations without departing from the scope of the invention.

The invention claimed is:

1. A turbine comprising:
   a tower bearing a nacelle and a rotor with a plurality of rotor blades; and
   an active noise reduction device, wherein the active noise reduction device comprises:
      at least one actuator,
      at least one unsteady pressure sensor adapted to produce an output signal corresponding to a turbulent flow condition during operation of a rotor blade,
      at least one noise sensor adapted to produce an output signal corresponding to a noise generated by the rotor blade at a location of the noise sensor, and
      a control unit,
      wherein the unsteady pressure sensor and the actuator are arranged on at least one rotor blade of the plurality of rotor blades and the noise sensor is arranged at the nacelle and/or at the tower,
      wherein the control unit is adapted to control the actuator in dependence of the output signals of the unsteady pressure sensor and the noise sensor to emit an anti-noise signal at least partly reducing the noise generated by the rotor blade.

2. The wind turbine according to claim 1, wherein the unsteady pressure sensor and the actuator are arranged in at least one arrangement portion of a shell of the rotor blade, further wherein the noise sensor is arranged on an outside of the nacelle and/or on an outside of the tower in an opposing portion that opposes the arrangement portion of the rotor blade at least partly when the rotor blade is aligned in a downward direction parallel to the tower.

3. The wind turbine according to claim 1, wherein the active noise reduction device comprises a plurality of noise sensors, wherein the noise sensors are arranged annularly around an outer circumference of the tower.

4. The wind turbine according to claim 1, wherein the unsteady pressure sensor and/or the actuator are arranged in a tip region of the rotor blade and/or that the unsteady pressure sensor is arranged on a trailing edge of the rotor blade.

5. The wind turbine according to claim 1, wherein the actuator comprises a loudspeaker and/or that the unsteady pressure sensor comprise a pressure transducer, and/or that the noise sensor comprises a pressure transducer, in particular a microphone.

6. The wind turbine according to claim 1, wherein the control unit is adapted to apply at least one filter function to the output signal of the unsteady pressure sensor for determining an input signal for the actuator to emit the anti-noise signal, further wherein the control unit is adapted to adjust the filter function in dependence of the output signal of the noise sensor in an adaptive feedforward control.

7. The wind turbine according to claim 6, wherein the control unit comprises or is connected to a rotor orientation sensor determining the relative position between the plurality of rotor blades and the tower during an operation of the wind turbine, further wherein the control unit is adapted to adjust the filter function in a period of time in which the at least one rotor blade is at least temporarily in a downward direction parallel to the tower.

8. The wind turbine according to claim 1, wherein on each of the plurality of rotor blades at least one actuator and at least one unsteady pressure sensor are arranged, further wherein the control unit is adapted to use a separate filter function for each of the plurality of rotor blades and to adjust the separate filter functions each in a period of time in which the corresponding rotor blade is at least temporarily in a downward direction or a nearly downward direction parallel to the tower.

9. The wind turbine according to claim 1, wherein the control unit is adapted to use an adaptive filter of a filtered-x least mean squares (FxLMS) algorithm as the filter function.

10. The wind turbine according to claim 1, wherein the at least one rotor blade comprises a trailing edge with a passive noise reduction device.

11. A method for noise reduction for a wind turbine comprising a tower bearing a nacelle and a rotor with a plurality of rotor blades and an active noise reduction device, wherein the active noise reduction device comprises at least one actuator, at least one unsteady pressure sensor adapted to produce an output signal corresponding to a turbulent flow condition during operation of a rotor blade, at least one noise sensor adapted to produce an output signal corresponding to a noise generated by the rotor blade at a location of the noise sensor, and a control unit, wherein the unsteady pressure sensor and the actuator are arranged on at least one rotor blade of the plurality of rotor blades and the noise sensor is arranged at the nacelle and/or at the tower, wherein the control unit controls the actuator in dependence of the output signals of the unsteady pressure sensor and the noise sensor to emit an anti-noise signal at least partly reducing the noise generated by the rotor blade.

12. The method according to claim 11, wherein the control unit applies at least one filter function to the output signal of the at least one unsteady pressure sensor for determining an input signal for the actuator to emit the anti-noise signal, further wherein the control unit adjusts the filter function in dependence of the output signal of the noise sensor in an adaptive feedforward control.

13. The method according to claim 12, wherein the control unit comprises or is connected to a rotor orientation sensor determining the relative position between the plurality of rotor blades and the tower during an operation of the wind turbine, further wherein the control unit adjusts the filter function in a period of time in which the at least one rotor blade is at least temporarily in a downward direction or a nearly downward direction parallel to the tower.

14. The method according to claim 12, wherein on each of the plurality of rotor blades at least one actuator and at least one unsteady pressure sensor are arranged, further wherein the control unit uses a separate filter function for each of the plurality of rotor blades and adjusts the separate filter functions each in a period of time in which the corresponding rotor blade is at least temporarily in a downward direction or a nearly downward direction parallel to the tower.

15. The method according to claim 12, wherein the control unit uses an adaptive filter of a filtered-x least mean squares (FxLMS) algorithm as the filter function.

16. The wind turbine according to claim 1, wherein the at least one noise sensor measures the noise by the rotor blade closest to the tower.

17. The method according to claim 11, wherein the at least one noise sensor measures the noise by the rotor blade closest to the tower.

* * * * *